(12) United States Patent
Rios et al.

(10) Patent No.: US 8,175,651 B2
(45) Date of Patent: May 8, 2012

(54) DEVICES AND METHODS FOR AUTOMATING INTERACTIVE VOICE RESPONSE SYSTEM INTERACTION

(75) Inventors: Edward Rios, Mc Henry, IL (US); Pilapakam B. Ramji, Mundelein, IL (US); Francis P. Bourque, Mundelein, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1176 days.

(21) Appl. No.: 11/957,605

(22) Filed: Dec. 17, 2007

(65) Prior Publication Data

US 2009/0154666 A1  Jun. 18, 2009

(51) Int. Cl.
*H04B 1/38* (2006.01)

(52) U.S. Cl. .................. 455/566; 455/556.2; 379/88.18

(58) Field of Classification Search .............. 455/556.2, 455/566; 379/88.18
See application file for complete search history.

(56) References Cited

U.S. PATENT DOCUMENTS

| | | | |
|---|---|---|---|
| 5,737,394 A * | 4/1998 | Anderson et al. .......... 379/88.11 |
| 6,061,576 A * | 5/2000 | Terrasson ..................... 455/566 |
| 6,310,947 B1 * | 10/2001 | Polcyn ..................... 379/211.01 |
| 6,408,191 B1 * | 6/2002 | Blanchard et al. ............ 455/566 |
| 7,027,571 B1 | 4/2006 | Cook |
| 7,099,656 B2 * | 8/2006 | Chefalas et al. ........... 455/412.1 |
| 7,286,821 B2 * | 10/2007 | Kraft et al. ..................... 455/415 |
| 2003/0099335 A1 | 5/2003 | Tanaka et al. |
| 2004/0121814 A1 * | 6/2004 | Creamer et al. .............. 455/563 |
| 2005/0094775 A1 | 5/2005 | Smith, Jr. et al. |
| 2006/0285662 A1 | 12/2006 | Yin et al. |

OTHER PUBLICATIONS

Peter Mikhalenko, "Speech Synthesis Markup Language: An Introduction", http://www.xml.com/lpt/a/1488, Oct. 20, 2004, 6 pages.
"Speech Application Language Tags", http://xml.coverpages, org/salt.html, 20 pages.

* cited by examiner

*Primary Examiner* — Simon Sing

(57) ABSTRACT

Disclosed are devices and methods for receiving, by a telephone device, data of an Interactive Voice Response (IVR) menu tree that is made available to the telephone device by a server of a remote database, or in the alternative, is made dynamically available to the telephone device. In an embodiment, an IVR menu tree may include menu tags according to a menu description protocol and may be delivered as the IVR menu tree is updated so that the telephone device receives an up-to-date menu tree automatically. The received IVR menu tree may be visually output to the display screen of the telephone device. Accordingly, the received IVR menu tree can be visual menu output rendered as a menu tree display and configured to be navigable on the display screen by a user input device, such as a joy stick or key pad.

18 Claims, 7 Drawing Sheets

```xml
<xml version="02.01">
    <menu dataentry=1 tag="AccountNumber">
        Enter Account Number
        <menu dataentry=1 tag"PIN">
            Enter PIN
        </menu>
    </menu>
    <menu digitmap="1">
        Account Balance
    </menu>
    <menu digitmap="1" service="CheckingBalance">
        Checking Account
    </menu>
    <menu digitmap="2">
        Pay Bill
        <menu digitmap="1" service="PayVisaBalance">
            Pay Visa Balance
        </menu>
    </menu>
    <menu digitmap="1">Pay Utility Bill
        <menu digitmap="1" service="paygas">Pay Gas</menu>
        <menu digitmap="2" service="payelectricity">Pay Electricity</menu>
    </menu>
</xml>
```

FIG. 5

DEVICES AND METHODS FOR AUTOMATING INTERACTIVE VOICE RESPONSE SYSTEM INTERACTION

FIELD

Disclosed are devices and methods for interacting with an interactive voice response system, and more particularly, for interacting with an interactive voice response system based on previous responses and/or based on downloads from a server.

BACKGROUND

Businesses use Interactive Voice Response (IVR) systems to manage customer service contact points. An IVR system uses a navigable menu tree to which responses, either voice or Dual Tone Multi-Frequency (DTMF), lead a caller to a branch of the menu tree. It may take a caller several minutes, and or several navigation attempts to reach his or her desired service contact point. That is, the navigation may be extensive before a caller reaches the desired contact point. As businesses seek to control costs, particularly in telephone bank personnel, IVR systems will continue to be popular to manage common telephone inquiries and route telephone callers to the proper live associate.

Most callers find IVR systems difficult to navigate. On the other hand, if an IVR caller repeatedly calls the same IVR system, the user may find the navigation task repetitive and time consuming. There is little that a caller can do to speed up the process of going through an IVR system. If the caller is a frequent user of the system, the caller may remember what numbers to press however, most users do not. Additionally, many callers press "0" in order to skip the menus and connect to a live person, but many systems have moved this option elsewhere, forcing callers to proceed through the navigation system to learn which key to press to connect to a live person.

When a caller with a mobile communication device or a particular type of landline telephone navigates an IVR system and the caller opts to respond to prompts of the IVR system with DTMF tones, the caller must repeatedly place the telephone to his or her ear, to listen for the prompts of the IVR system, and then remove the telephone from his or ear to press the keypad of the telephone to make the response to the prompt. The process of entering keypresses may make the navigation of the IVR system very slow. However, the alternative of entering voice responses that can be misunderstood by the voice recognition software employed by the IVR system, may also add time as well to the navigation process.

BRIEF DESCRIPTION OF THE DRAWINGS

FIG. 5 shows an example of a menu tag.

DETAILED DESCRIPTION

Figure 1:
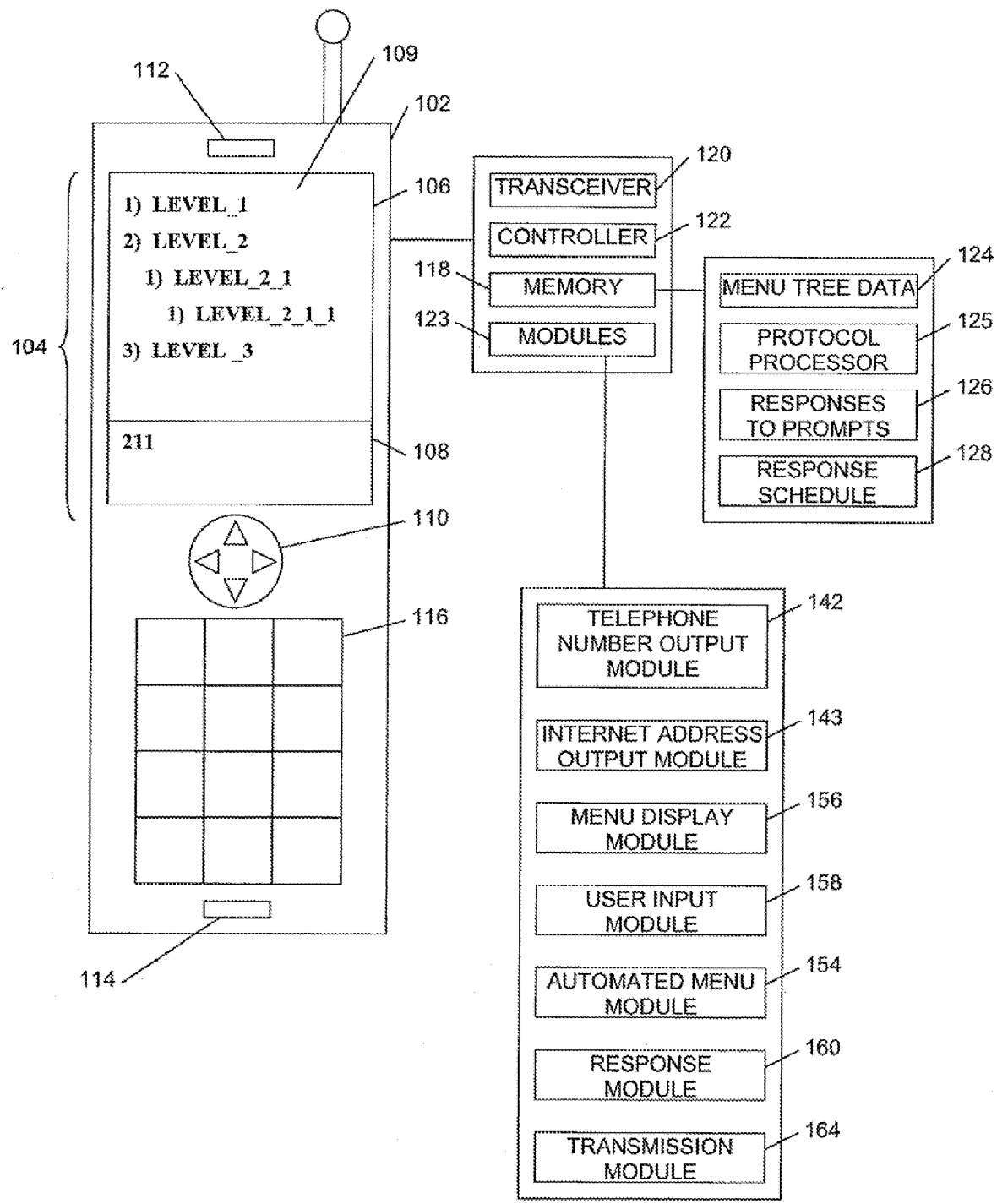
FIG. 1 depicts a telephone device having a display screen rendering a menu tree of an IVR system.

It would be beneficial if a telephone user, and in particular, a mobile communication device user, could view on a display screen a directory of an IVR system in the form of, for example, a menu tree, and be able to navigate the menu tree for example, with a joy stick or by presses of a key pad. It may be beneficial that by viewing the menu tree, a user may be able to bypass certain prompts and make selections quickly that lead the user to his or her desired customer service contact point. In this way, a user can view a menu tree structure during a call without abandoning the call. It may be also beneficial if a user's responses to prompts were stored in the telephone device.

It would also be beneficial were the telephone device to generate a response schedule based on the timing of the prompts of and responses to the IVR system. It would be beneficial were the responses the IVR system made automatically by the telephone device in accordance with the response schedule. Since often IVR systems are designed to receive responses to prompts, the prompts of the IVR system may be delivered according to a timing schedule so it can recognize the user response. The response schedule in conjunction with retrieval of previously entered responses may benefit a user in that the user may avoid re-entering responses for IVR systems that the user accesses more than one time. In this manner, a user may be automatically connected to his or her desired customer service contact point with little or no manual input to the IVR system.

Disclosed are devices and methods for receiving, by a telephone device, data of an IVR menu tree that is made available to the telephone device by a server of a remote database, or in the alternative, is made dynamically available to the telephone device. In a dynamic embodiment, an IVR menu tree includes menu tags according to a menu description protocol and may be delivered as the IVR menu tree is updated so that the telephone device receives an up-to-date menu tree automatically. A dynamic embodiment may include, for example, a Session Initiation Protocol (SIP) session as will be described below. In either case, the received IVR menu tree may be visually output to the display screen of the telephone device. Accordingly, the received IVR menu tree can be visual menu output rendered as a menu tree display and configured to be navigable on the display screen by a user input device, such as a joy stick or key pad.

Also disclosed are devices and methods for storing in memory the response input to the IVR menu tree by the user input device. Further disclosed is a timed response schedule that can be generated based on the data of the menu tree including timed prompts and responses to prompts. The response input by the user input device can be retrieved from the memory and transmitted via for example, a transceiver, in accordance with the response schedule. Accordingly, the user may avoid re-entering responses for IVR systems that are accessed more than one time.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims.

It is understood that the use of relational terms, if any, such as first and second, up and down, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. In the interest of brevity and minimization of any risk of obscuring the principles and concepts according to the present invention, discussion of such software and ICs, if any, is limited to the essentials with respect to the principles and concepts within the preferred embodiments.

FIG. 1 depicts a telephone device having a display screen rendering a menu tree of an IVR system. In the depicted embodiment, the telephone device is a mobile communication device 102. The mobile communication device 102 may be implemented as a cellular telephone (also called a mobile phone). The mobile communication device 102 represents a wide variety of devices that have been developed for use within various networks. Such handheld communication devices include, for example, cellular telephones, messaging devices, personal digital assistants (PDAs), notebook or laptop computers incorporating communication modems, mobile data terminals, application specific gaming devices, video gaming devices incorporating wireless modems, and the like. Any of these portable devices may be referred to as a mobile station or user equipment. Herein, wireless communication technologies may include, for example, voice communication, the capability of transferring digital data, SMS messaging, Internet access, multi-media content access and/or voice over Internet protocol (VoIP).

The display screen 104 is depicted as a split screen where IVR data may be rendered on the menu tree display area 106 and a representation of data input may be rendered to the data input display area 108. The menu tree 109 of the menu tree display area 106 may be navigated by a joystick or navigation pad 110. It is understood that while depicted as a split screen, display screen 104 may be a single screen or have more than two portions. More than one screen may be used as well, depending upon the configuration of the telephone device 102. For example, in an embodiment of a laptop computer telephone device, where the screen size is large compared to that of a mobile communication telephone device, there may be any number of windows open to navigate the menu tree and input responses.

To navigate a menu tree and input responses is of course not limited to a visual menu output by the display screen 104. The menu tree 109, for example, may be audibly delivered by an earpiece or speaker 112 of the mobile communication device 102. The response to prompts of the IVR system menu tree, whether given in a voice response into the mouth piece 114 or input by a user input device, such as a keypad 116 that may provide Dual Tone Multi-Frequency (DTMF) response input by key depression, may be stored in memory 118.

As discussed above, disclosed are devices and methods for receiving data of an IVR menu tree to a telephone device that is made available to the telephone device by a server of a remote database, or in the alternative, is made dynamically available to the telephone device. In a dynamic embodiment, an IVR menu tree includes menu tags according to a menu description protocol and may be delivered as the IVR menu tree is updated so that the telephone device receives an up-to-date menu tree automatically. Therefore, data of an IVR system menu tree is delivered to mobile communication device 102 and received via a transceiver 120 and is processed by the controller 122 so that it is output either to the display screen 104 in a form such as the menu tree 109 or by audio output by the earpiece or speaker 110. For convenience, output will be discussed as output to the display screen 104.

As mentioned, the controller 122 processes the received data of an IVR system menu tree. The controller 122 may process the received menu tree data so that some or all of the menu hierarchy may be displayed on the display screen 104. A user may scroll through the displayed menu tree 109 hierarchy. In this way, by viewing the menu tree 109, a user may be able to navigate the displayed menu tree 109 and may be able to bypass certain prompts to make selections quickly that lead the user to his or her desired customer service contact point.

As an example, in an example where a user makes a conference call, the user interface of the device including for example the display 104 may display a menu tree 109 and prompt a user for the telephone number of the conference call, which could be retrieved from a telephone book or directory of the telephone device 102. The information such as the passcode for the conference call may also be stored in memory 118 of the device. For example, the initial menu tree 109 for the conference code may be as follows:

| Phone number: | 1800 conference number |
|---|---|
| DTMF 1: | #1 |
| DTMF 2: | #2 |
| DTMF 3: | #8764873 (passcode) |

Once initially set up, the data of the IVR system menu tree stored in memory 118 may be automatically accessed so that the application sets up the call, and sends the DTMF tones at the appropriate times according to scheduled responses. In this manner, a user may be automatically connected to his or her desired customer service contact point with little or no manual input to the IVR system.

The data of the IVR system menu tree may be received in various ways and processed in accordance with modules 123, as described in the following communication examples. In one embodiment, a telephone number output module 142 for processing by the controller 122 a telephone number to transmit via the transceiver 120 a signal to a remote voice response server (not shown) may process a call so that the controller 122 may receive via the transceiver 120 the data of a menu tree 124. The data of the menu tree 124 may be overwritten with a new set of data in the event that there is a change to the data. Alternatively, in another embodiment, an Internet address output module 143 for processing an Internet address to transmit via the transceiver 120 a signal to a remote voice response server (not shown) may process an Internet connection so that the controller 122 may receive via the transceiver 120 the data of a menu tree. The data of the menu tree 124 may include menu tags according to a menu description protocol. The menu description protocol may be for example a Session Initiation Protocol (SIP) and a protocol based on an extensible markup language (XML). SIP is an application-layer control (signaling) protocol for creating, modifying, and terminating sessions with one or more participants. It can be used to create two-party, multiparty, or multicast sessions that include Internet telephone calls, multimedia distribution, and multimedia conferences. It is understood that any suitable protocol and/or generalized or specific markup language may used in the described process. In a dynamic manner, for example, updated data of a menu tree may be pushed by the remote server to the telephone device 102 and/or received and processed by the controller 122.

In both of the above-described embodiments, that is, a non-dynamic process and a dynamic process where updates to the menu tree data 124 are made automatically, the transceiver 120 is coupled to the controller 122 and is configured to receive data of a menu tree. The memory 118 is coupled to the controller 122 and configured to store data pertaining to data of the menu tree 124. As discussed, a display screen 104 is coupled to the controller 122 and configured to display output, in this example a rendering of the hierarchy of the menu tree. A user input device 110 and/or 116, to navigate the menu tree and/or input responses to prompts, is coupled to the controller 122 and is configured to receive user input. A menu display module 156 stored in the memory 118 may be configured to generate prompts displayed on the display screen 104 based on data of a menu tree 124. A user input module 158 is configured to receive data via the user input device 110 and or 116 to make a response to a prompt generated by the menu display module 156.

As mentioned above, the response to prompts of the IVR system menu tree, whether given in a voice response into the mouth piece 114 or input by a user input device, such as a keypad 116 that may provide Dual Tone Multi-Frequency (DTMF) response input by key depression, may be stored in memory 118. An automated menu module 154 stored in the memory 118 includes instructions executable by the controller 122. The automated menu module 154 may be configured to generate a response schedule based on the data of the menu tree received via the transceiver. A response module 160 may be configured to retrieve response data 126 pertaining to data of the menu tree 124 from the memory 118 to make a response based on the response schedule 128. A transmission module 164 may be configured to transmit via the transceiver 120 the stored response 126 in accordance with the response schedule 128.

The modules 123 can carry out certain processes of the methods as described herein. The modules 123 can be implemented in software, such as in the form of one or more sets of prestored instructions, and/or hardware, which can facilitate the operation of the mobile station or electronic device as discussed below. The modules 123 may be installed at the factory or can be installed after distribution by, for example, a downloading operation. The operations in accordance with the modules 123 will be discussed in more detail below.

In this way the telephone device 102 can generate a timed response schedule 128 based on the timing of the prompts of and responses to the IVR system stored as menu tree data 124. Accordingly, the responses 126 to the IVR system prompts may be made automatically by the telephone in accordance with the response schedule 128. Beneficially, a user may avoid re-entering responses for IVR systems that the user accesses more than one time. In this manner, a user may be automatically connected to his or her desired customer service contact point with little or no manual input to the IVR system.

Figure 2A:
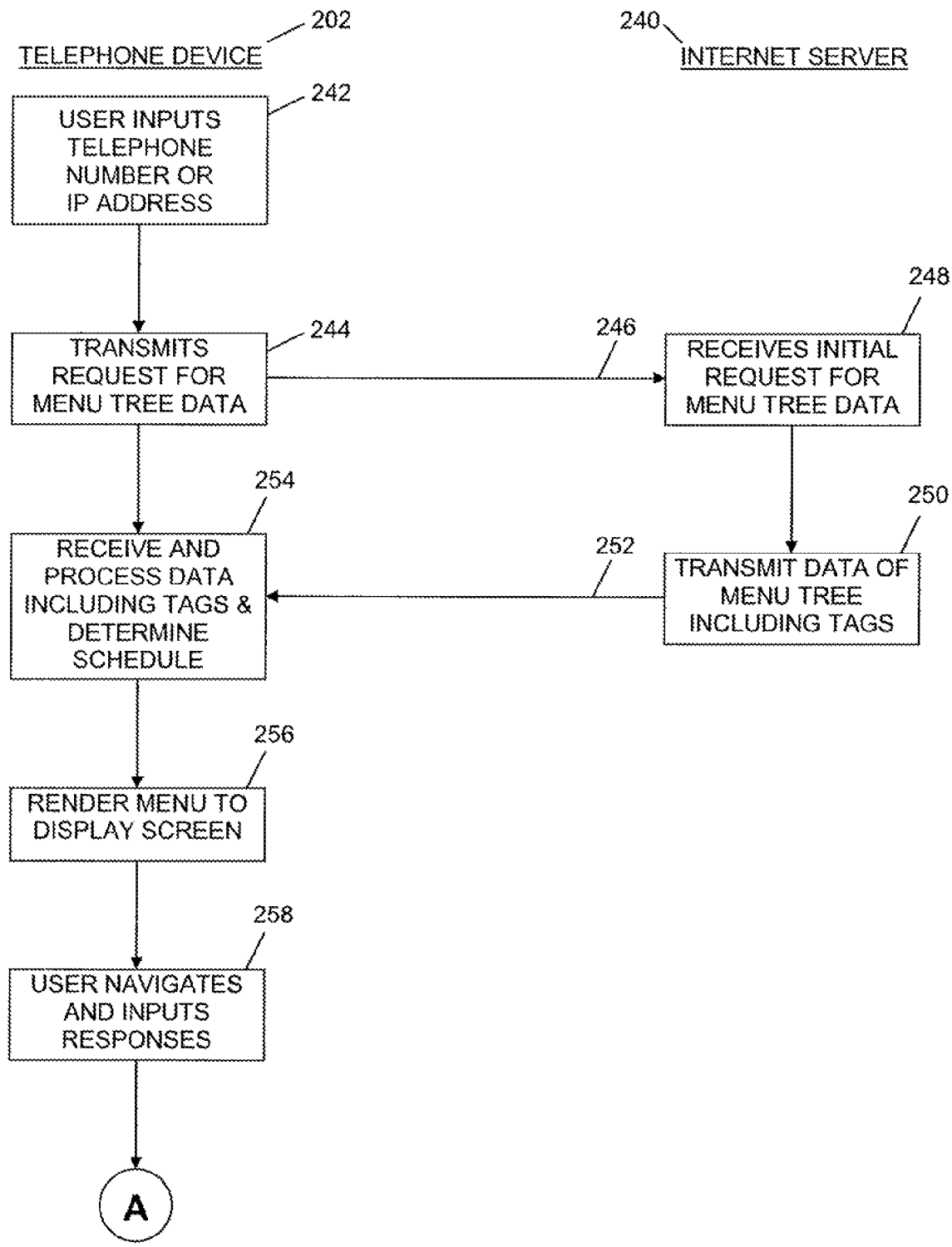
FIG. 2A and FIG. 2B together depict a signal flow diagram of an embodiment where an IVR menu tree includes menu tags according to a menu description protocol.
Figure 2B:
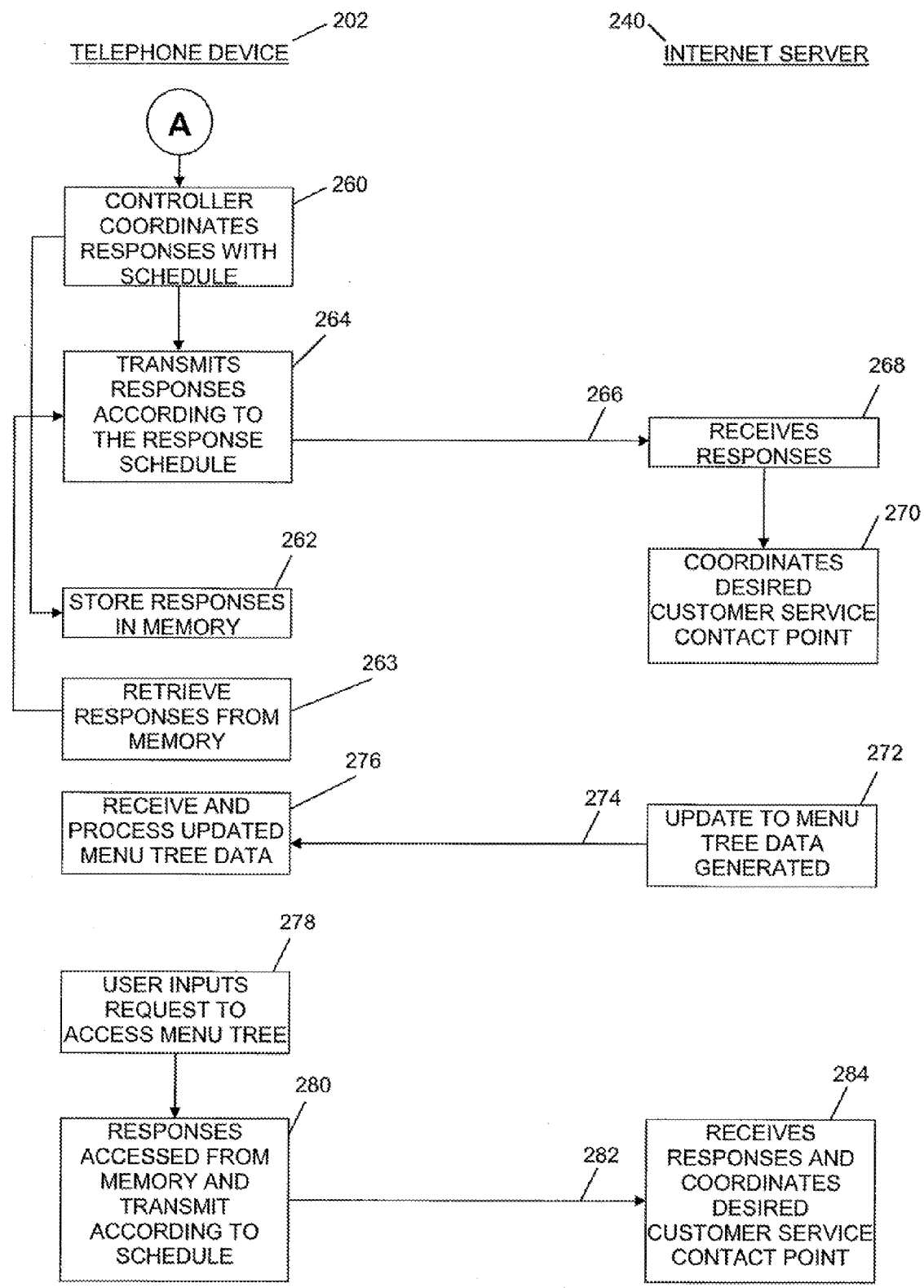

FIG. 2A and FIG. 2B together depict a signal flow diagram of an embodiment where an IVR menu tree includes menu tags according to a menu description protocol and may be delivered as the IVR menu tree is updated so that the telephone device receives an up-to-date menu tree automatically or semi-automatically. In a dynamic manner, for example, updated data of a menu tree may be pushed by a remote server to the telephone device 202 and/or received and processed by the controller 122 (see FIG. 1).

The telephone device 202 and Internet server or other remote server 240 are depicted. The server 240 is depicted as a remote Internet server that may be within a wireless communication network. The network of course may be any type of wireless network including an ad hoc or wireless personal area network, a WiFi or wireless local area network, and a cellular or wireless wide area network. Likewise, the server 240 may be of any suitable configuration. The server 240 may be implemented as a single server or as a plurality of servers in communication in any arrangement. The operations of the server 240 may be distributed among different servers or devices that may communicate in any manner. It is understood that the depiction in FIG. 2A and FIG. 2B is for illustrative purposes. For example, a user may be using his mobile phone from home to access his banking information through his bank server. In another example, a customer who has a small business may be contacting a computer manufacturer's server to get support.

A user may input a telephone number or IP address 242 to initially contact a remote server that can download IVR menu tree data. The telephone device 202 may transmit a request 244 to the remote server 242. The transmission 246 for menu tree data is received 248 by the remote server 240. As an example, the request could be a simple SIP INVITE request to establish a call or when SIP is not supported, a Hypertext Transfer Protocol (HTTP) request. The request may include fields to indicate that the telephone device 202 is configured to process menu tags according to a menu description protocol processor 125 (see FIG. 1) which is stored in memory 118, where the menu description protocol may be a session initiation protocol (SIP) and a protocol based on an extensible markup language (XML). The Internet server 240 may transmit 250 data of a menu tree including menu tags. FIG. 5 below shows an example of a menu tag.

The transmission 252 to the telephone device 202 includes the menu tree data 124. The sources of the IVR menu data may vary. Some companies may chose to make the information available. In other cases it may be made available by the open-source community. An Outline Processor Markup Language (OPML) Directory is an example of an open-source community website with lists of OPML information freely available on the Internet.

The controller 122 (see FIG. 1) may process menu tags according to the menu description protocol processor 125 in accordance with the automated menu module 154, the menu module configured to generate a response schedule 128 based on the received data of the menu tree. The response schedule 128 may be generated at any time in the process. Its construction by the controller 122 can be based on the menu tags and/or it may be based on actual responses provided during a session with an IVR system. The response schedule 128 may provide data to the IVR system when the IVR prompts for it without user input. An example is an online banking session. Were a user to call an online bank, certain information may be retrieved from the memory 118 such as a user account number and a password, so it may be transmitted according to appropriate timing of the IVR system requiring no input by the user.

IVR systems are often designed to receive responses to prompts. Accordingly, the prompts of the IVR system may be required to be delivered before it can recognize the user response. The response schedule 128 (see FIG. 1) in conjunction with retrieval of previously entered responses may benefit a user in that the user may avoid re-entering responses for IVR systems that the user accesses more than one time. In this manner, a user may be automatically connected to his or her desired customer service contact point with little or no manual input to the IVR system.

As mentioned, the response schedule 128 (see FIG. 1) may be generated at any time in the process. In the example shown in FIG. 2A and FIG. 2B, the response schedule construction by the controller 122 can be based on the menu tags. As also mentioned, transmitted 252 data of the menu tree includes menu tags according to a menu description protocol and the menu description protocol is at least one of a session initiation protocol (SIP) and a protocol based on an extensible markup language (XML). To display the IVR system data on the display screen 104 (see FIG. 1) that of course can be any type of display screen, the menu tree data stored in memory 118 may be stored, for example, in the Outline Processor Markup Language (OPLM) which may enable the controller to separate an option's number from its description.

OPML or any other suitable mark up language may enable processing and scripting of the IVR data, and thus rendering of a navigable menu 256 to the display screen in accordance with the menu display module 156 (see FIG. 1) configured to generate prompts displayed on the display screen 104 based on data of a menu tree received via the transceiver 120. As the user navigates the menu tree hierarchy on the display screen 104, options for the current IVR menu are displayed. If synchronized browsing is enabled, the experience can be simplified by causing the telephone device 202 to send DTMF tones simultaneously with the navigation. The user experience then may be akin to having two-way communication with the IVR system and having feedback on the display screen 104 of the device 202. The processed navigable menu may be stored in memory 118 in any suitable format. Moreover, the format may support multiple languages such as English and Spanish including an opportunity for a user to select a preferred language. A multi-language capability is beneficial in the event that an English speaker for example, is connected to an IVR system presented in another language since short phrases may translate easily.

If synchronized browsing is not available, as mentioned above, a split screen 104 (see FIG. 1) having two portions 106 and 108 may enable a user to navigate the IVR data without affecting the communication itself. The top half of the screen 106 which contains the IVR information can be navigated using the telephone device's 202 four way navigation pad 110 or joystick without sending a DTMF tone. If the user wishes to send a DTMF tone to indicate a menu selection, the user can indicate a selection, for example, may press the number for the selection by pressing the keypad keys 116 which would be indicated on the bottom half of the screen 108.

While the user may have the option to query the IVR system database at the remote server 240 as soon as a telephone number or Internet address is entered 242, there may be some latency in receiving the data and being able to process input. At least two methods including background downloading and data pre-fetching may be used to reduce or eliminate the delay. When background downloading is enabled, the telephone device may query the database of the server 240 for each of the telephone numbers or Internet addresses in the device telephone book. In this way, the IVR system menu tree data is already cached when the user initiates a call. For an automatic background download, the telephone device 202 controller 122 can query any number with "main" tag (as opposed to "work" or "mobile" tags). The main tag could identify a telephone number as a company IVR system telephone number. The user may manually make a query after pressing the number but before pressing send. The telephone device 202 may query the database in the background for all numbers in an address book.

Data pre-fetching on the other hand, may be a middle ground between a background download and a simultaneous query. In a simultaneous query, querying to the server is done as the user is typing the phone number. If a user were to type 800-555-5555 and then press "Send," the phone would query the remote database for data on this phone number. In data pre-fetching, on the other hand, the phone may have an option of querying the database before the user presses "Send", and in this way pre-fetching can help prevent latency issues. As soon as a user enters a telephone number or Internet address, the user may have the option of querying the data base before initiating the communication if the previously processed menu tree is, for example, cached. Once the data is downloaded 252 or retrieved from a cache, the user can proceed with the call substantially without latency.

As discussed above, the user may navigate the menu tree 109 (see FIG. 1) and input responses 258. A user input module 158 may be configured to receive data via the user input device 110 and/or 116 (see FIG. 1) to make a response to a prompt generated by the menu display module 156 as described above. If the user input is received for the first time pursuant to a particular menu tree 109, or if there is a change in the user input pursuant to the particular menu tree 109, the responses can be coordinated 260 with a response schedule 128 that was previously determined 254, the response module 160 can be configured to retrieve from the memory data pertaining to data of the menu tree 109. Of course, the responses can either be stored 262 in memory 118 or transmitted and then stored, or transmitted and stored simultaneously. It is understood that the process of the embodiment shown in the signal flow diagram may be in any suitable order.

In certain IVR systems, such as banking, user names and passwords are entered as responses to prompts. In storing such responses in memory 262, there may be a concern that sensitive information would be at risk, particularly if a mobile communication device 202 were lost or stolen. Accordingly, sensitive or all stored responses and information may be secured for example by encryption or other security process.

Before storage 262 in memory 118 (see FIG. 1) or after, or upon retrieval 263 from memory, the response can be transmitted 264 in accordance with the transmission module 164 configured to transmit via the transceiver the response in accordance with the response schedule 128. The transmission of the response 266 may be received 268 by the Internet Server 240 which can coordinate the response with the user's desired customer service contact point 270. In particular when the responses are retrieved from memory 263, and transmitted according the response schedule 264, the process may benefit a user in that the user may avoid re-entering responses for IVR systems that the user accesses more than one time. In this manner, a user may be automatically connected to his or her desired customer service contact point with little or no manual input to the IVR system.

In a dynamic IVR system, the menu tree may be updated routinely or at various times. The Internet Server 240 may have stored data relating to the telephone device 202 that received the menu tree data 252. In order to keep the menu tree current, the Internet Service may update 272 and push or download 274 either a new menu tree or instructions to change or revise 276 a current menu tree stored in the memory 118 (see FIG. 1) of device 202. In this way, a menu tree may be cached either based on the most recent use, or by a revised or new menu tree being stored in memory 118 so that the controller 122 may execute read-ahead logic and preload menu tree selections prior to use of the menu tree, to help avoid delays to the user in accessing prompts and processing responses.

As discussed above, the user can input a request to access a menu tree 278, the responses to prompts of the menu tree may be retrieved from memory 118 (see FIG. 1) and transmitted according to a response schedule 280. To request access to a preferred menu tree 278, the user would have bookmarked a menu in a previous access of the IVR system, and put the bookmarked menu item in a list of favorites related to the IVR services. A bookmarker can present a list of services that were previously accessed and may initiate an IVR session whether or not the menu structure has changed 276. The telephone device 102 would access the service by interacting with the server (via, for example, DTMF, SIP requests, or HTTP requests) based on saved menu structure, metadata in the menu structure, and/or previous data sent to the server such as the user identifier. The telephone device 102 would know what information was sent in the past through the metadata that is embedded in the menu structure definition. When the menu structure is updated, the telephone device 102 could still automate the access to the service by matching the metadata. In any event, either a telephone number or Internet address may be transmitted. It is understood that any transport may be used. The timed responses may be transmitted 282 in accordance with the telephone number output module 142 for processing a telephone number to transmit a request to a voice response server to receive the data of a menu tree. In another embodiment, as discussed, an Internet address output module 143 for processing an Internet address to transmit a signal to a voice response server to receive the data of a menu tree. In the example of FIG. 2, the Internet Server 204 receives 284 the responses and coordinates the user's desired customer service contact points.

Figure 3A:
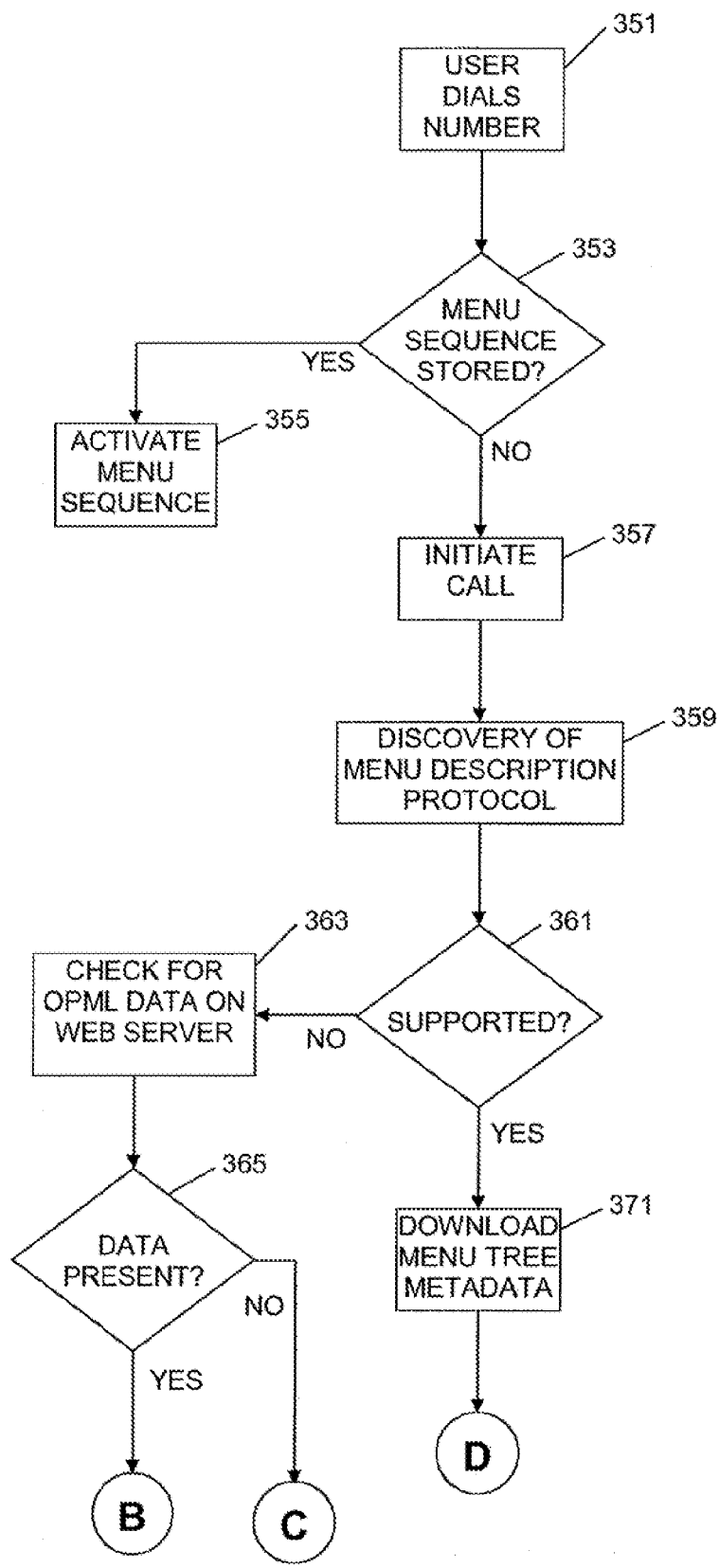
FIGS. 3A and 3B together depict a flow chart that illustrates how by default, menu tree data may be automatically downloaded from a server such as a SIP server if the service is supported by the telephone device.
Figure 3B:
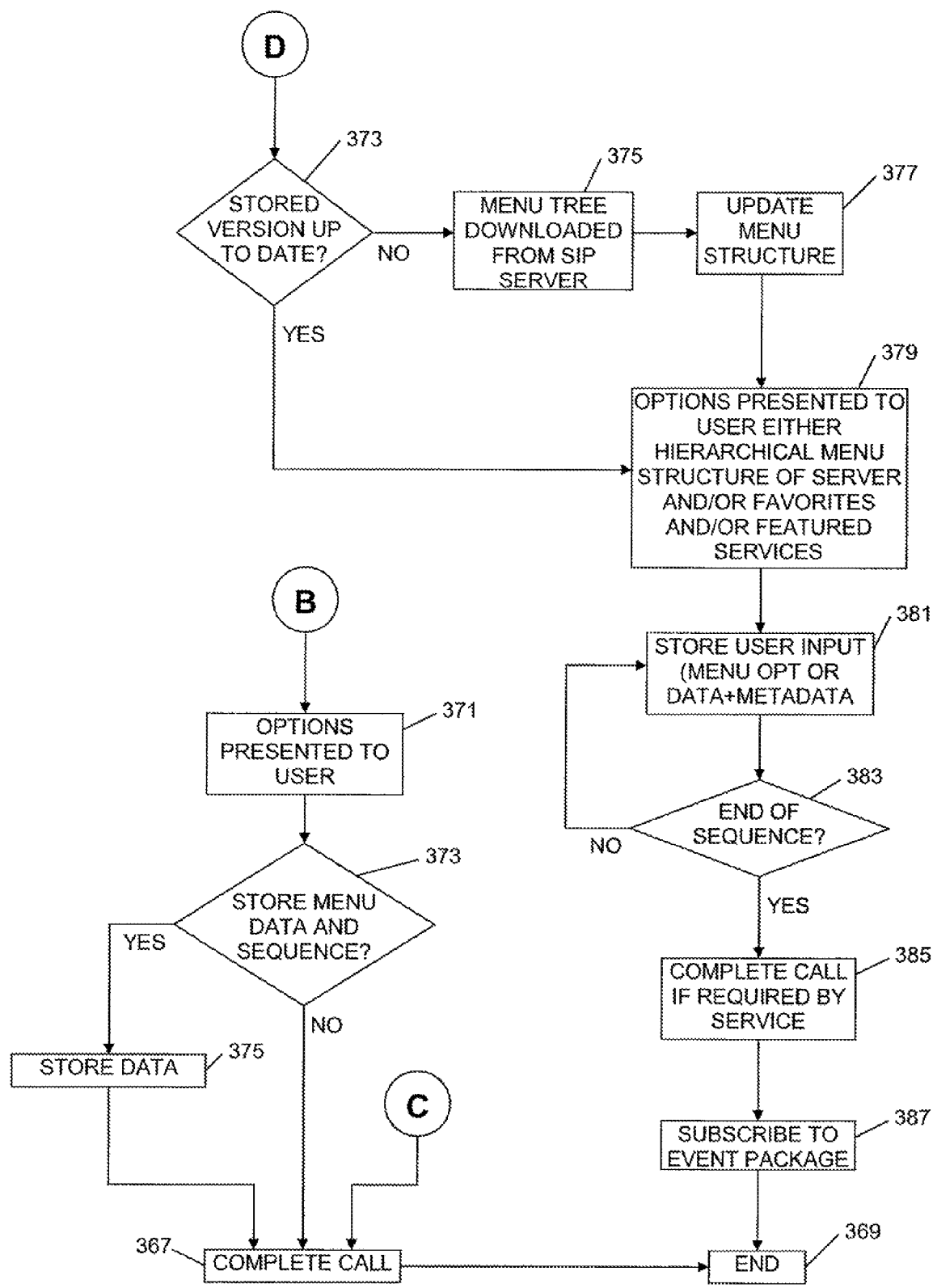

FIG. 3A and FIG. 3B together depict a flow chart that illustrates how by default, menu tree data may be automatically downloaded from a server such as a SIP server (not shown) if the service is supported by the telephone device 102 or 202 (see FIG. 1 and FIG. 2A). The benefit of a SIP server may be that a SIP user application on the telephone device 202 may receive options from the SIP server along with the session establishment and while the session is in progress. Otherwise, the process of FIG. 3A and FIG. 3B may allow for a fallback mode where menu tree data is downloaded from a web server, for example Internet server 240.

The SIP user application may provide the menu structure and thus help the user and the service provider optimize the IVR system service. A SIP user application stored in the memory 118 (see FIG. 1) of the device 102 provides instructions to the telephone device for interaction with the SIP server. For example, the SIP user application may be allowed to determine which option to select from the same or a subsequent session with the knowledge of the information that is expected and/or required for a current service session from that which was previously entered. A benefit of communication with a SIP server is that the SIP call set may be automated during an actual session. Accordingly, user involvement may be reduced or removed.

In the described SIP session, there may be available interlacing textual session information during the SIP session with multimedia such a pictures, sound clips and video to enhance the user experience. Accordingly, visual and audio feedback may be provided during session establishment. A SIP server option may improve efficiency for users in avoiding key strokes and by providing some perspective to the user on the menu structure and thus the services that are offered. The SIP server option may potentially reduce traffic and conserve resources since a user's session payload is not commenced until the user comes online and after all the initial information has been provided by the user.

The flowchart of FIG. 3A and FIG. 3B includes that the user dials 351 a number as discussed above. There is a menu sequence query 353 by the telephone device 102 (see FIG. 1) whether a menu sequence is stored. If there is already a menu sequence stored then the menu sequence may be activated 355 including commencing a SIP session. If the answer is no to the menu sequence query 353 whether there is a menu sequence stored, then a call 357 to a SIP server may be initiated. The controller 122 may discover 359 whether there is stored in memory 118 a menu description protocol. If the menu description query 361 is negative, a process similar to that as described in FIG. 2 involving an Internet server 240 may be initiated. That is the telephone device 102 will check 363 for available OPML data on a web server. The data presence query 365 whether such data is present may establish that none is present in which case the call may be completed 367 and the process may end 369. On the other hand, the data presence query 365 whether such data is present may establish that data is present in which case options as discussed with respect to FIG. 2 may be presented 371 to the user. A stored version query 373 may determine whether or not the menu data and sequence should be stored. If there is a positive response to the stored version query 373, the menu data and sequence may be stored 375. If the menu data and sequence should not be stored, the call will be completed 367 and the process may end 369.

As described above, the controller 122 may discover 359 whether there is stored in memory 118 a menu description protocol supported. If the response to the menu description protocol query 361 is positive, then a SIP server may download 371 menu tree metadata. The telephone device 102 may make a stored version query 373 whether menu tree data stored on the telephone device 102 is up-to-date. If not, a new menu tree may be downloaded 375 from the SIP server, or update information may be downloaded. The menu structure can be updated 377. If the response is yes to the stored version query 373 whether menu tree data stored on the telephone device 102 is up-to-date, options may be presented 379 to the user, for example, of either a hierarchical menu structure of services and/or favorites and/or featured services. As the user responds, the telephone device 102 may store 381 user input such as menu options and/or data plus metadata. There may be an end sequence query 383 as to whether the sequence or session has ended. If the session has not ended, there may be a loop back to the storing step 381. If the session has ended, the call may be completed 385 if required by the service. Also, the user or the telephone device 102 may subscribe 387 to an event package. An event package is a concrete application (or an instantiation) of the SIP event framework to a particular class of events. Typically, an event package definition would encompass the package name, the body of the SUBSCRIBE and NOTIFY requests supported, the processing of the SUBSCRIBE request, when notifications will be generated, as well as other details defined in the RFC 3265 document (http://www.rfc-editor.org/rfc/rfc3265.txt. After the user or telephone device subscribing 387 to an event package, the process may end 369.

Figure 4:
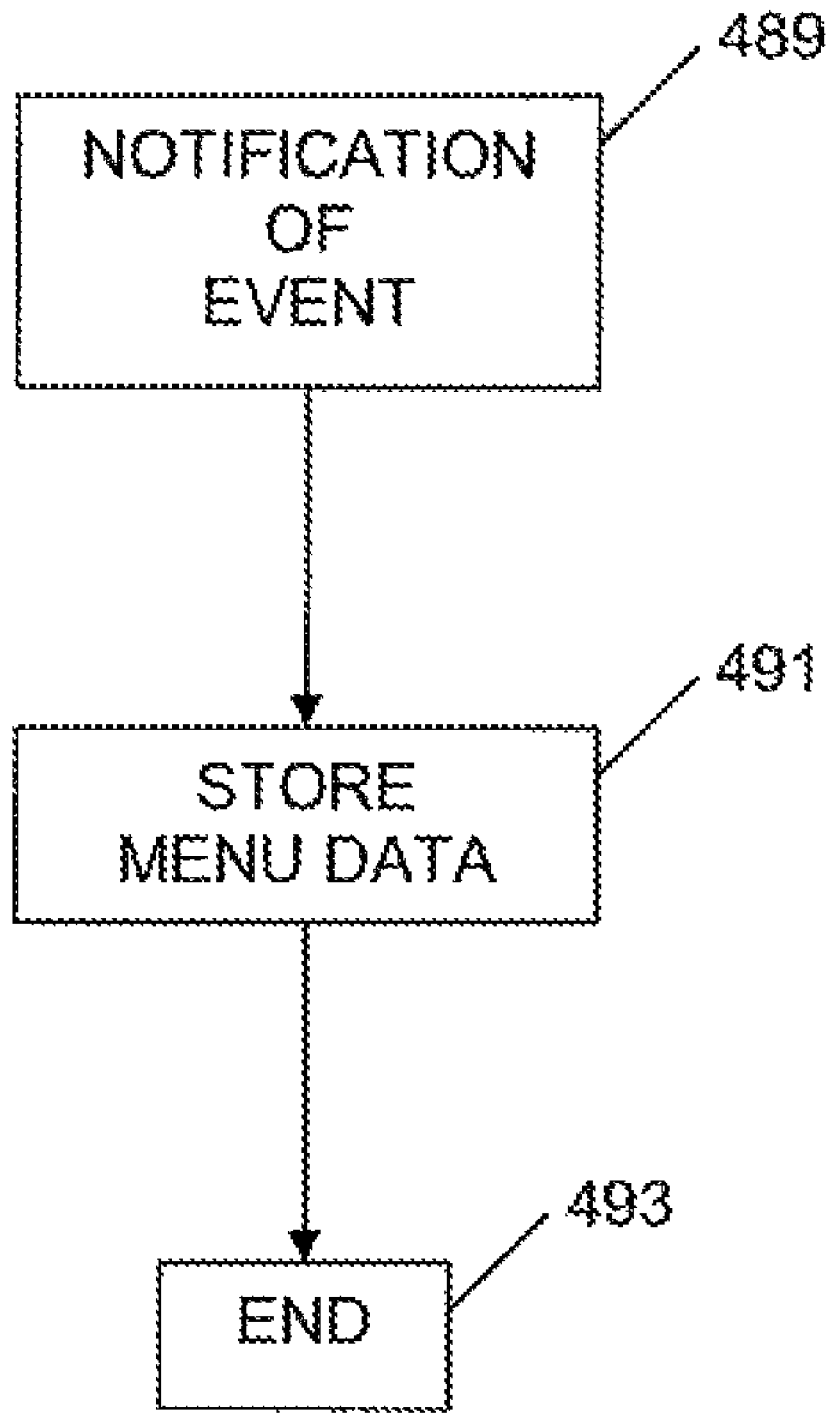
FIG. 4 illustrates that there may be data updates from the SIP server.

FIG. 4 illustrates that there may be data updates from the SIP server. The flow may occur when the menu structure is automatically updated via a notification event. The notification event 489 may be, for example, a SIP NOTIFY request (formatted according to the SIP rules) with the SIP Event header set appropriately to indicate the menu options event package, the SIP Content-Type header set appropriately to identify a menu description and an XML body containing the detailed menu structure. The telephone device may receive the data update and store 491 the data update and end the update process 493.

As previously discussed, the menu data, as well as menu data updates, may include meta information or meta data in the form of menu tags. FIG. 5 shows an example of a menu tag. Italicized terms in the example of FIG. 5 are explained below. In the example menu tag, digitmap indicates which key is expected;

service is the metadata information related to the service obtained after that sequence, and can be useful to retrieve the service if location changed;

dataentry indicates that a series of digits is expected from the user; and tag is used along with dataentry such that the device can remember what was entered for subsequent session where this information is requested.

As previously discussed in connection with FIG. 2, a markup language such as, for example, XML may be used in the menu tag description. Accordingly, the device may receive meta data and data updates so that an IVR menu tree can be made available to a telephone device.

The disclosed are devices and methods for receiving, by a telephone device, data of an IVR menu tree that is made available to the telephone device by a server of a remote database, or in the alternative, is made dynamically available to the telephone device, and that may allow a telephone device user to view on a display screen a directory of an IVR system in the form of, for example, a menu tree. A user therefore may be able to navigate the menu tree for example, with a joy stick or by presses of a key pad. A user therefore may be able to bypass certain prompts and make selections quickly that lead the user to their desired customer service contact point. In this way, a user can view a menu tree structure during a call without abandoning the call.

Beneficially, in the disclosed devices and methods, a response schedule can be generated based on the data of the menu tree including timed prompts and responses to prompts. The response input by the user input device can be retrieved from the memory and transmitted via the transceiver in accordance with the response schedule. Accordingly, the user may avoid re-entering responses for IVR systems that are accessed more than one time.

In a dynamic embodiment, an IVR menu tree includes menu tags according to a menu description protocol and may be delivered as the IVR menu tree is updated so that the telephone device receives an up-to-date menu tree automatically. A dynamic embodiment may include, for example, a Session Initiation Protocol SIP session. In any case, the received IVR menu tree may be visually output to the display screen of the telephone device. In this manner, a user may be automatically connected to his or her desired customer service contact point with little or no manual input to the IVR system.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A telephone device, comprising:

a controller;

a transceiver coupled to the controller and configured to receive data of a menu tree;

a memory coupled to the controller and configured to store data pertaining to data of the menu tree;

a display screen coupled to the controller and configured to display output;

a user input device coupled to the controller and configured to receive input;

a menu display module stored in the memory and including instructions executable by the controller, the menu display module configured to generate prompts displayed on the display screen based on data of a menu tree received via the transceiver;

a user input module configured to receive data via the user input device to make a response to a prompt generated by the menu display module;

an automated menu module configured to generate a response schedule based on the data of the menu tree received via the transceiver;

a response module configured to retrieve from the memory data pertaining to data of the menu tree; and a transmission module configured to transmit via the transceiver the response in accordance with the response schedule.

2. The device of claim 1, wherein the data received via the user input device is navigation input pertaining to navigation of the menu tree.

3. The device of claim 1, wherein:

the memory is configured to store data pertaining to data of the menu tree; and based on particular navigation input pertaining to navigation of the menu tree, data pertaining to the menu tree is transmitted by the transceiver.

4. The device of claim 1, wherein:

data of the menu tree includes menu tags according to a menu description protocol.

5. The device of claim 4, wherein the menu tags indicate updates to the menu tree.

6. A telephone device, comprising:

a controller;

a transceiver coupled to the controller, configured to receive data of a menu tree;

a memory coupled to the controller, configured to store data pertaining to data of the menu tree;

an automated menu module stored in the memory and including instructions executable by the controller, the menu module configured to generate a response schedule based on the data of the menu tree received via the transceiver;

a response module configured to retrieve data pertaining to data of the menu tree from the memory to make a response based on the response schedule; and a transmission module configured to transmit via the transceiver the response in accordance with the response schedule.

7. The device of claim 6, further comprising:

a microphone device coupled to the controller; and an earpiece device coupled to the controller, wherein:

the menu tree is a voice menu output by the earpiece device; and the response is a voice response input by the microphone device and stored in memory.

8. The device of claim 6, further comprising:

a display device coupled to the controller; and a user input device coupled to the controller;

wherein:

the menu tree is visual menu output by the display device; and the response is a Dual Tone Multi-Frequency (DTMF) response input by the user input device and stored in the memory.

9. The device of claim 6, further comprising:

a display device coupled to the controller and configured to display a split screen having a menu tree display area and a data input display area; and a user input device coupled to the controller and including navigation keys and data entry keys;

wherein:

the menu tree is visual menu output rendered in the menu tree display area and configured to be navigable by the user input device;

the user input device is configured to accept data input via data entry keys; and the display device is configured to render a representation of the data input via data entry keys to the data input display area.

10. The device of claim 6, further comprising:

a display device coupled to the controller; and a user input device coupled to the controller;

wherein:

the menu tree is visual menu output by the display device; and the response is a voice response input by the user input device and stored in the memory.

11. The device of claim 6, further comprising:

a telephone number output module for processing a telephone number to transmit via the transceiver a signal to a voice response server to receive via the transceiver the data of a menu tree.

12. The device of claim 6, further comprising:

an Internet address output module for processing an Internet address to transmit via the transceiver a signal to a voice response server to receive via the transceiver the data of a menu tree.

13. The device of claim 6, wherein:

data of the menu tree includes menu tags according to a menu description protocol; and the menu description protocol is at least one of a session initiation protocol (SIP) and a protocol based on an extensible markup language (XML).

14. The device of claim 13, wherein the menu tags indicate updates to the menu tree.

15. A method of a mobile communication device, comprising:

receiving via a transceiver of the mobile communication device, data of a menu tree, the data of the menu tree conforming to a menu description protocol;

processing the data of the menu tree so that the menu tree is generated by a controller of the mobile communication device for output by a user interface of the mobile communication device, the menu tree based at least in part on the menu description protocol;

outputting at least a portion of the menu tree via the user interface to generate menu tree output;

receiving user input in response to the menu tree output;

generating a response schedule based on the data of the menu tree received via the transceiver;

retrieving data pertaining to data of the menu tree from the memory to make a response based on the response schedule; and transmitting via the transceiver the response in accordance with the response schedule.

16. The method of claim 15, wherein the data of the menu tree conforming to a menu description protocol comprises the data of the menu tree conforming to at least one of a session initiation protocol (SIP) and a protocol based on an extensible markup language (XML).

17. The method of claim 15, further comprising:

storing the user input in response to the menu tree output as data pertaining to the data of the menu tree, to generate stored user input; and accessing the stored user input to automatically navigate to a previously selected menu tree branch.

18. The method of claim 15, wherein the data of the menu tree includes menu tags conforming to the menu description protocol, the method further comprising:

updating the menu tree in accordance with menu tags.

* * * * *